US011239914B2

(12) United States Patent
Poulain et al.

(10) Patent No.: US 11,239,914 B2
(45) Date of Patent: Feb. 1, 2022

(54) LIGHT FIXTURE THAT CAN BE CONNECTED TO A TELECOMMUNICATION NETWORK

(71) Applicant: LUCIBEL, Rueil Malmaison (FR)

(72) Inventors: Emilie Poulain, Le Grand Quevilly (FR); Loic Boinet, Le Mesnil Esnard (FR)

(73) Assignee: LUCIBEL, Rueil Malmaison (FR)

( * ) Notice: Subject to any disclaimer, the term of this patent is extended or adjusted under 35 U.S.C. 154(b) by 174 days.

(21) Appl. No.: 16/332,640

(22) PCT Filed: Sep. 11, 2017

(86) PCT No.: PCT/FR2017/000166
§ 371 (c)(1),
(2) Date: Mar. 12, 2019

(87) PCT Pub. No.: WO2018/050974
PCT Pub. Date: Mar. 22, 2018

(65) Prior Publication Data
US 2020/0366370 A1    Nov. 19, 2020

(30) Foreign Application Priority Data

Sep. 13, 2016 (FR) ..................................... 16 58544
Apr. 6, 2017 (FR) ..................................... 17 53008

(51) Int. Cl.
*H04B 10/116* (2013.01)
*F21S 8/02* (2006.01)
(Continued)

(52) U.S. Cl.
CPC ............ *H04B 10/116* (2013.01); *F21S 8/026* (2013.01); *F21V 3/00* (2013.01); *F21V 7/04* (2013.01);
(Continued)

(58) Field of Classification Search
CPC .................................................. H04B 10/116
See application file for complete search history.

(56) References Cited

U.S. PATENT DOCUMENTS

| 2010/0209105 A1* | 8/2010 | Shin | ..................... H04B 10/116 398/58 |
| 2011/0095690 A1* | 4/2011 | Sagal | ..................... F21V 31/04 315/113 |

(Continued)

FOREIGN PATENT DOCUMENTS

| FR | 3 029 373 A1 | 6/2016 |
| WO | WO 2016/122399 A1 | 8/2016 |

OTHER PUBLICATIONS

Kowalczyk, Marcin & Siuzdak, Jerzy; (2015); "Influence of reverse bias on the LEDs properties used as photo-detectors in VLC systems." 966205. 10.1117/12.2197831 (Year: 2015).*

(Continued)

*Primary Examiner* — Nathan M Cors
(74) *Attorney, Agent, or Firm* — Oblon, McClelland, Maier & Neustadt, L.L.P.

(57) ABSTRACT

A light fixture includes a housing defining a peripheral wall around a reference axis and being provided with a base defining a light emission window. The light fixture further includes a photoreceiver mounted on the base and configured to receive a light beam from the remote terminal carrying a data signal, called the uplink signal, a lighting module arranged in the housing and configured to emit a light beam carrying a data signal, called the downlink signal, through the window and a module for processing data signals according to at least one communication protocol of the network. The light fixture includes a printed circuit board, called the processing board, extending transversely (Continued)

inside the housing and remote from the base, on which the processing module is mounted.

20 Claims, 6 Drawing Sheets

(51) Int. Cl.
| F21V 3/00 | (2015.01) |
| F21V 7/04 | (2006.01) |
| F21V 15/01 | (2006.01) |
| F21V 19/00 | (2006.01) |
| F21V 23/04 | (2006.01) |
| F21V 33/00 | (2006.01) |
| H04B 10/114 | (2013.01) |
| H05B 45/00 | (2020.01) |
| H05B 47/195 | (2020.01) |

(52) U.S. Cl.
CPC .......... *F21V 15/01* (2013.01); *F21V 19/0055* (2013.01); *F21V 23/045* (2013.01); *F21V 33/0052* (2013.01); *H04B 10/114* (2013.01); *H05B 45/00* (2020.01); *H05B 47/195* (2020.01)

(56) References Cited

U.S. PATENT DOCUMENTS

| 2011/0110106 A1* | 5/2011 | Dupuy ............... F21S 8/026 |
| | | 362/368 |
| 2012/0086345 A1* | 4/2012 | Tran ................. G06F 3/011 |
| | | 315/158 |
| 2012/0268929 A1 | 10/2012 | Chung et al. |
| 2014/0341588 A1 | 11/2014 | Pederson |
| 2015/0214451 A1 | 7/2015 | Abe et al. |
| 2015/0341114 A1 | 11/2015 | Pederson |
| 2016/0128140 A1 | 5/2016 | Quilici et al. |
| 2016/0273741 A1* | 9/2016 | Jung ................ F21V 19/0055 |
| 2016/0381750 A1 | 12/2016 | Bong et al. |
| 2017/0026117 A1 | 1/2017 | Pederson |
| 2017/0171949 A1* | 6/2017 | Kim .................... F21K 9/235 |
| 2017/0351946 A1* | 12/2017 | Jayawardena ..... G06K 19/0728 |

OTHER PUBLICATIONS

International Search Report dated Nov. 30, 2017 in PCT/FR2017/000166, 4 pages.
Liane Grobe, et al., "High-Speed Visible Light Communication Systems" IEEE Communications Magazine, vol. 51, No. 12, XP011534246, Dec. 1, 2013, pp. 60-66.

\* cited by examiner

LIGHT FIXTURE THAT CAN BE CONNECTED TO A TELECOMMUNICATION NETWORK

This invention concerns a light fixture that can be connected to at least one telecommunication network, for example the Internet.

More particularly but not exclusively, the invention applies to a light fixture based on so-called LiFi technology (from the English "Light-Fidelity"). This technology consists of exchanging data by light flickers generated and perceived by a lighting system provided for this purpose, here the light fixture, and a remote terminal, for example a tablet, a computer or a mobile telephone. This enables the remote terminal to exchange data with a conventional telecommunication network, such as the Internet, connected to the light fixture when the remote terminal is located in the light field emitted by the light fixture.

More specifically, this LiFi technology consists of modulating the luminous intensity of the light emitted by the light fixture to code digital data. By effectuating such a modulation at very high frequencies, the variations in luminous intensity are not perceptible by the human eye.

For this purpose, the light fixture comprises notably a LiFi transmitter and a LiFi receiver, to with respectively a lighting source and a photoreceiver. The remote terminal generally comprises a LiFi transmitter and a LiFi receiver of the type with emission in the infra-red spectrum and reception in the visible spectrum or the infra-red spectrum.

The remote terminal and the light fixture form a bidirectional wireless telecommunications assembly making it possible to transfer digital data by uplink or downlink, i.e. from the user's terminal towards the photoreceiver associated with the lighting source then from the lighting source towards the remote terminal.

This enables a user located in the lighting zone of the LiFi transmitter of the light fixture to browse the Internet for example by sending requests to a server through this bidirectional wireless telecommunication assembly.

The disadvantage of the known bidirectional LiFi assemblies is that they are not compact: particularly, the infra-red source is located on a module separate from the LiFi transmitter. Consequently, setting up such elements proves to be very cumbersome and the manufacturing costs are also higher.

In addition, these elements specific to LiFi technology are particularly fragile and must be preserved from shocks and impacts that can occur when assembling or disassembling the light fixture.

The purpose of the invention is to respond, at least in large part, to the aforesaid problems and to lead to other advantages as well.

To that end, the subject of the invention is a light fixture that can be connected to at least one telecommunication network, such as the Internet for communicating data by light with a remote terminal, of the type comprising:
- a housing delimiting a peripheral wall around a reference axis and being provided with a base delimiting a light emission window,
- a photoreceiver arranged in the housing and configured to receive a light beam from the remote terminal carrying a so-called uplink data signal,
- a lighting module arranged in the housing and configured to emit a light beam through the window, carrying a so-called downlink data signal, and
- a module for processing data signals according to at least one communication protocol of the network, characterized in that the light fixture comprises a printed circuit board, called processing board, extending transversely inside the housing and at a distance from the base, on which the processing module is mounted.

Due to the invention, the processing board, the lighting module and the photoreceiver are housed inside the housing and are therefore protected from shocks and impacts.

In addition, the light fixture forms a harmonious assembly by integrating LiFi technology into the housing without undermining the aesthetics. Moreover, the processing board, by extending transversely in the housing, is less sensitive to any deterioration because it can be solidly affixed to the housing over its entire periphery.

With LiFi technology, the light fixture is able to communicate data with a remote terminal according to a theoretical throughput greater than ten megabits per second preferably greater than forty megabits per second.

A device according to the invention can also comprise one or several of the characteristics described below.

Preferably, the processing board occupies roughly the entire area of a cross section of the light fixture.

In one preferred embodiment of the invention, the processing board comprises an opening for transmitting the light emitted by the lighting module through the light fixture.

In one preferred embodiment, the processing board has the general shape of an open or closed crown in order to allow a transmission of light flux through the light fixture. This specific configuration makes it possible to optimize the usable area of the board without degrading the photometric aspects of the lighting of the light fixture.

In one preferred embodiment, the photoreceiver is connected electronically to the processing board by an electronic interconnection element extending roughly axially inside the housing.

The presence of an electronic interconnection element which extends roughly inside the body of the housing of the light fixture allows a terraced configuration of the processing board with respect to the base of the light fixture.

For example, the photoreceiver is carried by a printed circuit board, called photoreception board, and the electronic interconnection element is formed by a semiflex printed circuit flexible wafer connecting the photoreception and processing boards.

Preferably, taken axially, the distance between the base and the processing board is greater than ten millimeters.

In one preferred embodiment, the processing board extends between the lighting module and the base and in which the contour of the processing board delimits an opening for passage of the light emitted by lighting module towards the window.

In one preferred embodiment of the invention, the internal wall of the housing has studs protruding axially to receive screws for anchoring the processing board to the housing.

In one preferred embodiment of the invention, the lighting module comprising a lighting source and an optical element for shaping the light beam emitted by the lighting source and coupled to the lighting source, the processing board extends around the basic optical element.

Preferably, the optical element has a proximal end coupled to the lighting source and a distal end emerging onto the light emission window.

For example, the optical element is chosen from among a reflector comprising a reflective internal surface and a lens.

In one preferred embodiment, the housing comprises a cover mounted on the base to house the processing board and the lighting module, such as a cover in the general shape of a truncated bell.

For example, the base is made of a material essentially comprising a plastic or metal material.

In one preferred embodiment of the invention, the processing board comprises at least one element connecting to the telecommunication network and the housing comprises an opening for access to the connector through its peripheral wall.

Preferably, the light fixture comprises a casing plate which is configured to mask the access opening while delimiting a bezel that fits the peripheral contour of the connector.

In one preferred embodiment of the invention, the light fixture is intended to be embedded in an embedment opening of a structure that has a visible face and an opposite hidden face, the base carries means of holding the light fixture to the structure, which are configured for pressure-holding the light fixture through the structure.

Preferably, the light fixture comprises a part for thermal dissipation of the heat generated during the operation of the lighting module, carried by the housing.

Preferably, the processing module comprises at least one unit for receiving or at least one unit for emitting data signals according to LiFi technology.

Another subject of the invention is a processing board of the light fixture according to the invention, on which the processing module is mounted. The board has the general shape of an open or closed crown in order to delimit an opening for transmission of light when the board is mounted in the light fixture.

Other characteristics and advantages of the invention will appear in light of the following description, made in reference to the attached drawings, in which.

Figure 1:
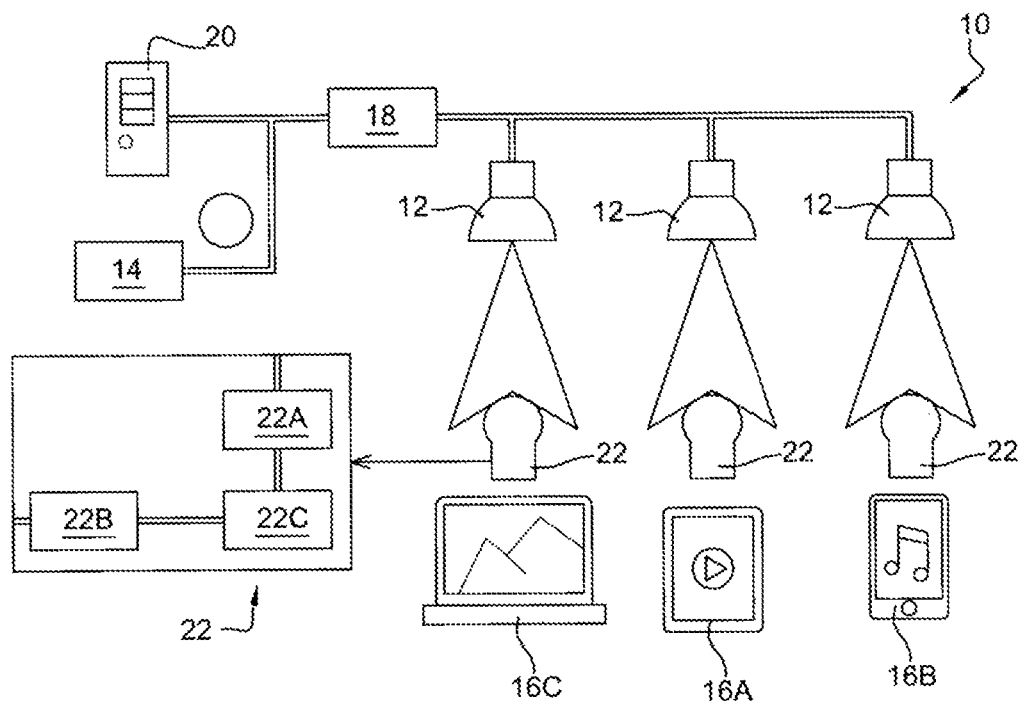
FIG. 1 shows a functional diagram of a LiFi architecture comprising a light fixture that can be connected according to the invention.

FIG. 1 shows schematically a communication assembly comprising a light fixture according to the invention. This communication assembly is designated by general reference 10 and the light fixture is designated by general reference 12. FIG. 1 shows three light fixtures 12. The rest of the description will describe only one of the three light fixtures 12.

Pursuant to the invention, the light fixture 12 can be connected to a telecommunication network 14 for the transmission of data by light with a remote terminal 16. The telecommunication network 14 can comprise an Internet network, an Intranet network, an Ethernet network or any other type of communication network.

The remote terminal 16 in the example describes a tablet 16A. As a variant, the remote terminal 16 can be a cellphone 16B, a work computer 16C, etc.

In this example, the telecommunication network 14 is the Internet network and the network communication protocol is TCP/IP communication protocol.

The light fixture 12 according to the invention thus forms a data transmission relay 21 between the remote terminal 16 and the communication network 14.

In self-evident fashion, the Internet network 14 is a global computer network representing the interconnection among a plurality of remote servers. The Internet network 14 can comprise a plurality of associated services, such as a web service, a message service, a station-to-station file-sharing service, or a videoconference service. Generally, these various services communicate for example with the TCP/IP protocol.

In the example described, the light fixture 12 is able to communicate data with a remote terminal according to a theoretical throughput greater than ten megabits per second, preferably greater than forty megabits per second, whether it be for example symmetrical or asymmetrical.

Of course, as a variant, the light fixture 12 can be connected to a local Intranet network represented by a local server 20 in FIG. 1.

As illustrated in the example in FIG. 1, each remote terminal 16 is equipped with a LiFi key 22 (designated in English by the terminology "dongle"). In the illustrated example, the LiFi key 22 comprises a photoreceiver 22A for receiving a data signal coming from light fixtures 12, a unit 22B for emission of a data signal generated from the terminal 14 and a unit 22C for processing the data signals transmitted or received.

Figure 2:
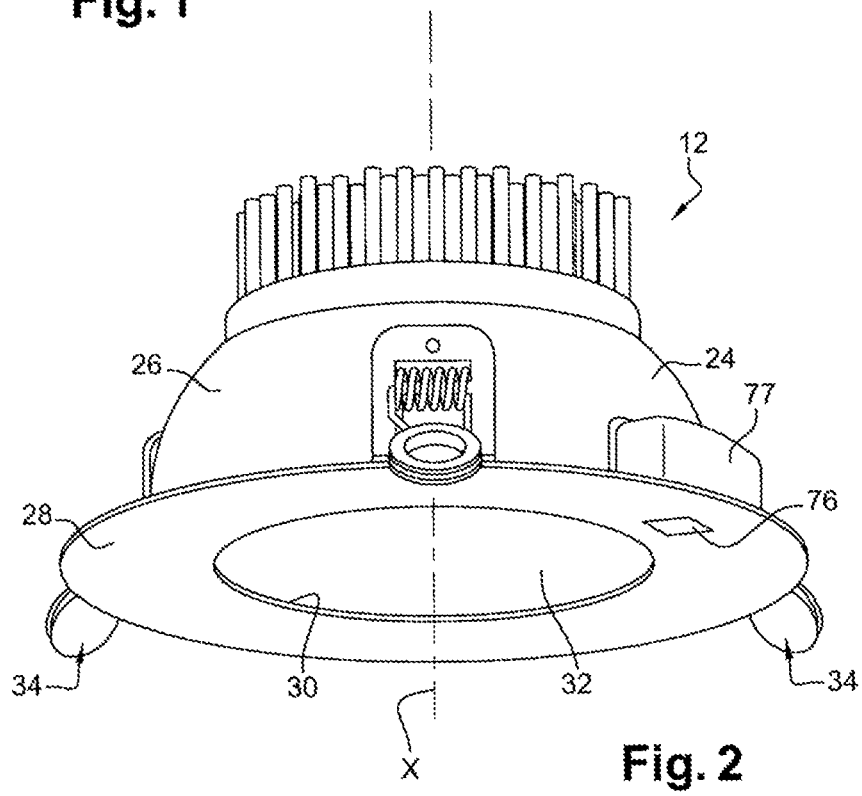
FIG. 2 shows a perspective view of the light fixture according to the invention from a first viewpoint.
Figure 3:
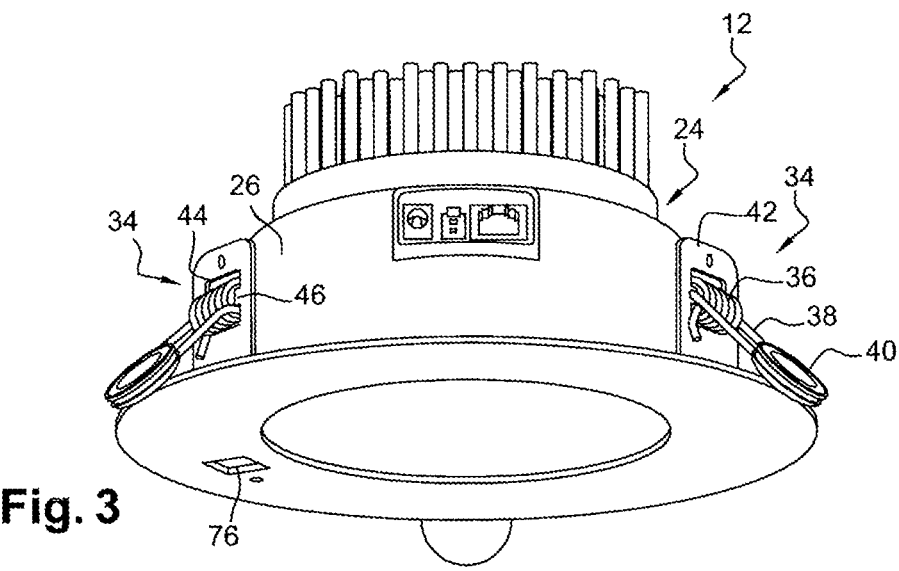
FIG. 3 shows a perspective view of the light fixture of FIG. 2 from a second viewpoint.
Figure 4:
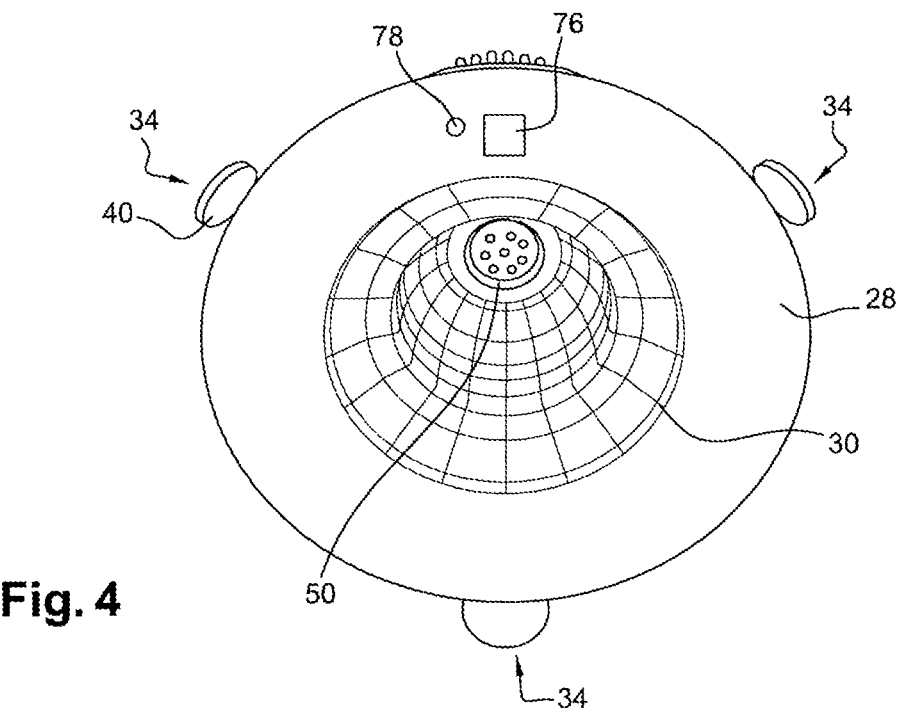
FIG. 4 shows a perspective view of the light fixture of FIG. 1 from a third viewpoint.

FIGS. 2 to 4 show in detail a light fixture 12 according to the invention. This light fixture 12 comprises a housing 24 delimiting a peripheral wall 26 around a reference axis X. The light fixture 12 also has a base 28 delimiting a light emission window 30. The light emission window 30 comprises for example a transparent pane 32 with a general circular shape. As a variant, the window 30 can comprise a diffuser.

In addition, preferably, the light fixture 12 is intended to be embedded in an embedment opening of a structure (not shown in the figures) that has a visible face and an opposite hidden face, for example a covering panel of a false ceiling.

For this purpose, in this embodiment, the light fixture 12 also comprises means 34 of securing the light fixture 12 to the structure which are adapted to allow for pressure-holding of the light fixture 12 through the structure.

Generally, a covering panel, for example a drop-ceiling panel, is spaced at a given height from a ceiling of a room, enabling the light fixture to be housed inside that space. The drop-ceiling then has an embedment opening with a given shape, intended to receive the light fixture and its connection to a network of electric cables. The drop-ceiling panel has a thickness that conventionally ranges between ten millimeters and forty millimeters.

In the described example, the holding means 34 can be moved from a cocked position pulled back against the light fixture 12 to a deployed position by elastic return against the hidden face of the casing structure.

Preferably, these holding means 34 have a spring. They each comprise one spring 36 connected to a double shaft 38, and this double shaft 38 can have, at its end, a dampening tip 40 like the one illustrated in detail in FIG. 3.

These means 34 are configured to exert pressure on the hidden face of the wall or the embedment structure of the light fixture 12 and to press the base 28 of the light fixture 12 against the visible face. Thus, the wall is vice-gripped between the sprung holding means 34 which exerts pressure on the hidden face of the wall, on the one hand, and the base 28 which comes to be pressed against the visible face.

In this embodiment, the holding means 34 are affixed onto the base 28 of the light fixture 12. The holding means 34 comprise a support 42 in the shape of a folded strip or in a general L shape. For this purpose, the support 42 has an opening 44 for housing the spring 36 that has two tenons 46 that extend transversely and protrude into the opening. These two tenons 46 define an axis of rotation around which the spring 36 of the holding means 34 is articulated. Thus in this example, the opening 44 has a general double T shape. The spring 36 is maintained by two tenons 46 which are intended to be engaged inside the spring 36 by its two free ends.

As is visible in FIG. 4, the light fixture 12 also comprises a lighting module 50 arranged in the housing 24 and configured to emit a light beam through the window 30. This lighting module 50 comprises a lighting source 52. The lighting module 50 preferably comprises a plurality of light-emitting diodes 52.

Figure 9:
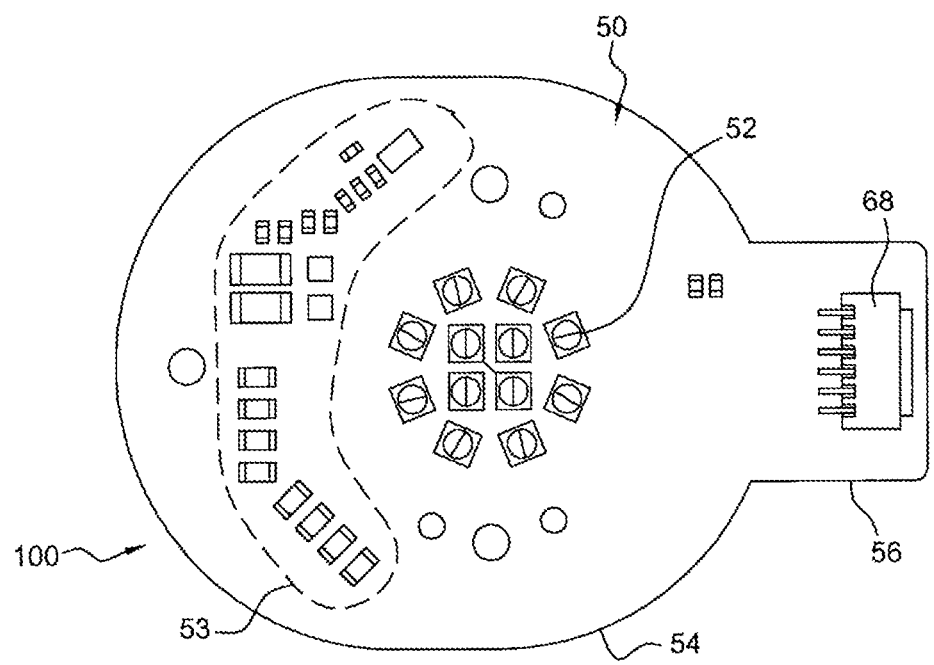
FIG. 9 shows a top view of a printed circuit board for the lighting module of the light fixture according to the invention.

Preferably, the lighting module 50 comprises a printed circuit board 100, illustrated in FIG. 9, carrying the plurality of light-emitting diodes 52. In the rest of the description, the printed circuit board 100 is referred to as emission board 100.

As illustrated in FIG. 9, the lighting module 50 comprises twelve light-emitting diodes 52. The emission board 100 is made of a material allowing effective thermal dissipation of the heat generated by the diodes 52.

In the example illustrated in FIG. 9, the emission board 100 comprises a main portion 54 and a secondary portion 56. The main portion 54 has a general disc shape and the secondary portion 56 forms a radial protuberance of the main portion 54 with a general rectangular shape. However, the general shape of the emission board 100 is not in any way restrictive.

Figure 5:
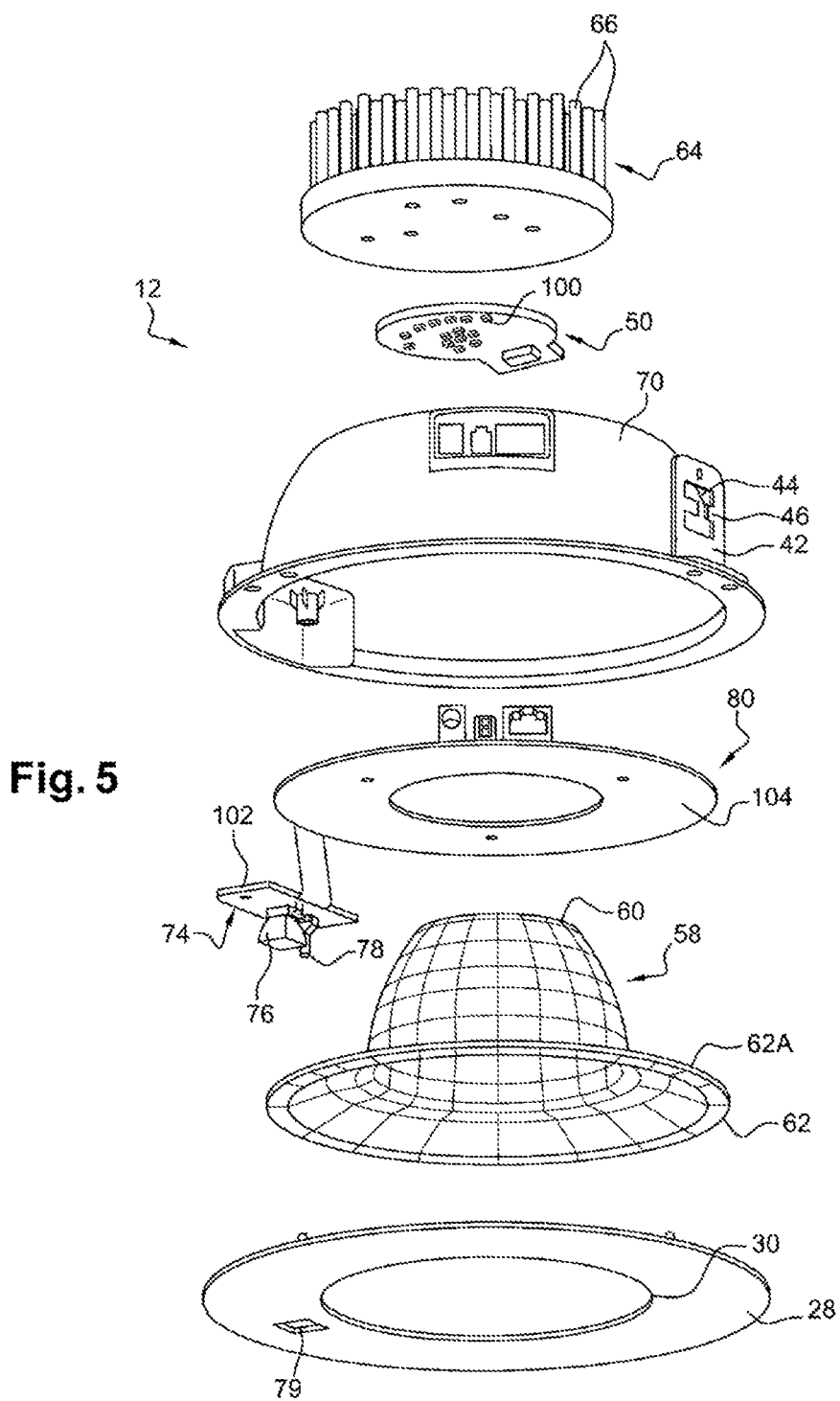
FIG. 5 shows an exploded view of the light fixture of FIGS. 2 to 4.

In this embodiment and as is visible in FIG. 5, the lighting module 50 also comprises an optical element 58 for shaping the light beam emitted by the lighting source 52 and coupled to the lighting source 52. Thus, for example, the optical element 58 has a proximal end 60 coupled to the lighting source 52 and a distal end 62 emerging onto the light emission window 30. In this embodiment, the basic optical element 58 is a reflector comprising a reflective internal surface. The reflector 58 has a truncated general shape with, at its distal end 62, a rim 62A extending radially that comes to rest on the internal surface of the base 28 when the light fixture 12 is mounted (FIG. 5).

In a variant not shown, the optical element 58 can comprise a lens.

The light fixture 12 also comprises preferably a heat sink 64 making it possible to evacuate the heat generated during the operation of the lighting source 52. This heat sink 64 is made up of a set of pins 66 made of material that has heat-conductive properties (for example, the pins are made of aluminum).

The lighting module 50 also comprises a connection terminal 68 for the electric connection of the lighting module 50 to another module of the light fixture 12. In the example illustrated, this terminal 68 is carried by the secondary portion 58 of radial protuberance of the emission board 54A.

According to the invention, the lighting module 50 is placed in the housing 24 to emit light through the window 30.

Figure 6:
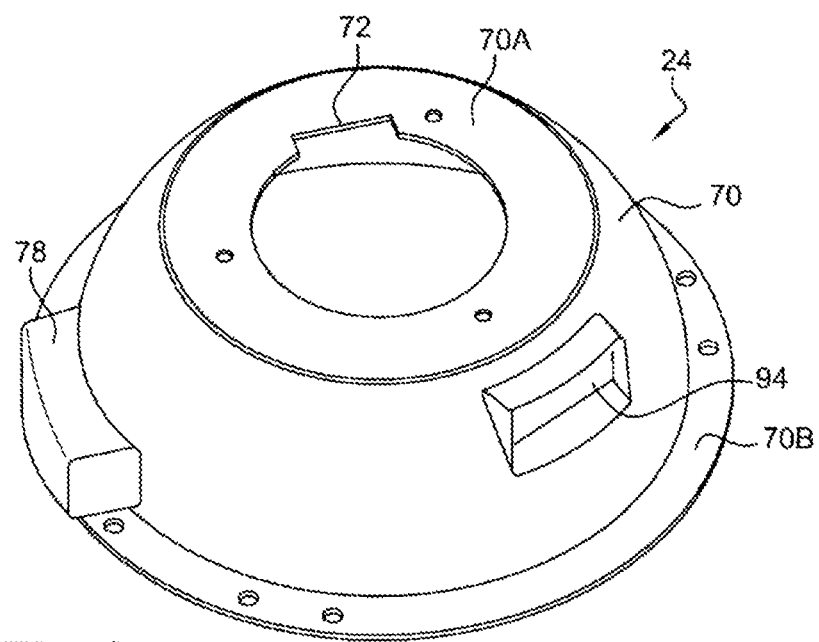
FIG. 6 shows a perspective view from above of a protective cover shown in FIG. 5.
Figure 7:
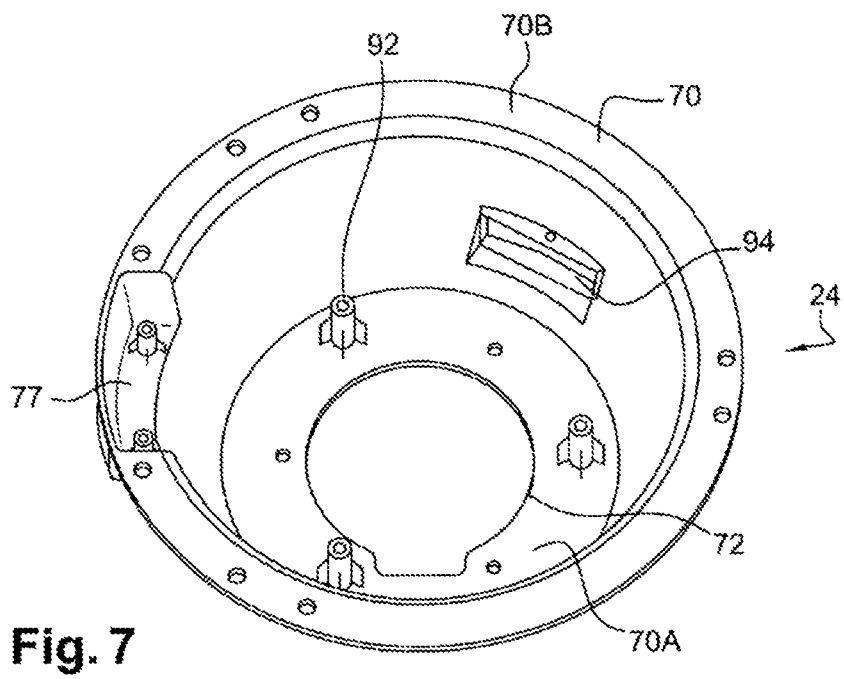
FIG. 7 shows a perspective view from below of the protective cover of the light fixture in FIG. 6.
Figure 8:
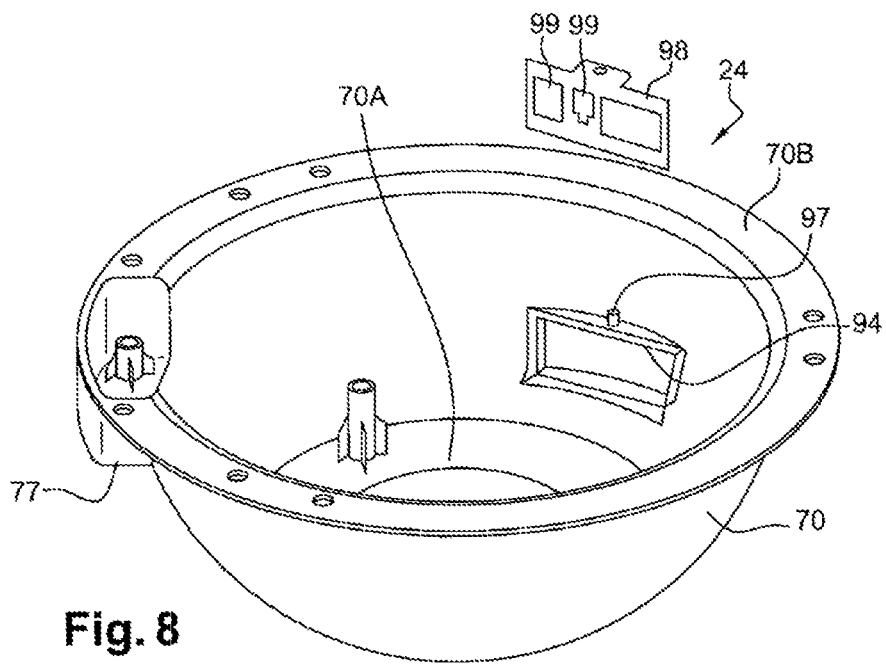
FIG. 8 shows a view of the cover of FIG. 6 and a casing plate.

As illustrated in FIGS. 6 to 8, the housing 24 comprises a shell 70 made of molded plastic. The shell 70 has for example a general shape of a truncated bell defining a proximal end 70A carrying the heat sink 64 and the lighting module 50 and a distal end 70B delimiting an opening for passage of the light flux. At its proximal end 70A, as illustrated in FIGS. 6 and 7, the bell 70 has an opening 72 that has a general shape complementary to the shape of the emission board 100. Thus, the shell 70 forms a cover mounted on the base 28 which carries the lighting module 50. The base 28 is made of a material essentially comprising a plastic material or a metal material.

Moreover, the truncated surface of the bell 70 is configured to receive the heat sink 64 being in contact with the module 50 in order to assure effective thermal dissipation of the module 50.

In this embodiment, the light fixture 12 comprises a photoreception module 74. This photoreception module 74 comprises a photoreceiver 76 arranged in the housing 24. For this purpose, the shell 70 has a protuberance 77, formed for example by molding, delimiting a hollow cavity to house the photo-reception module 74 visible in FIGS. 6 and 7.

More precisely, the photoreceiver 76 is mounted on the base 28, for example on the periphery of the light emission window 30. In addition, the base 28 comprises an opening 79 (FIG. 5) to allow the insertion of the photoreceiver 76. In the example described, the photoreceiver 76 is mounted plumb with the opening 76 in order to be visible from a light emission side of the light fixture through the opening 76.

Figure 10:
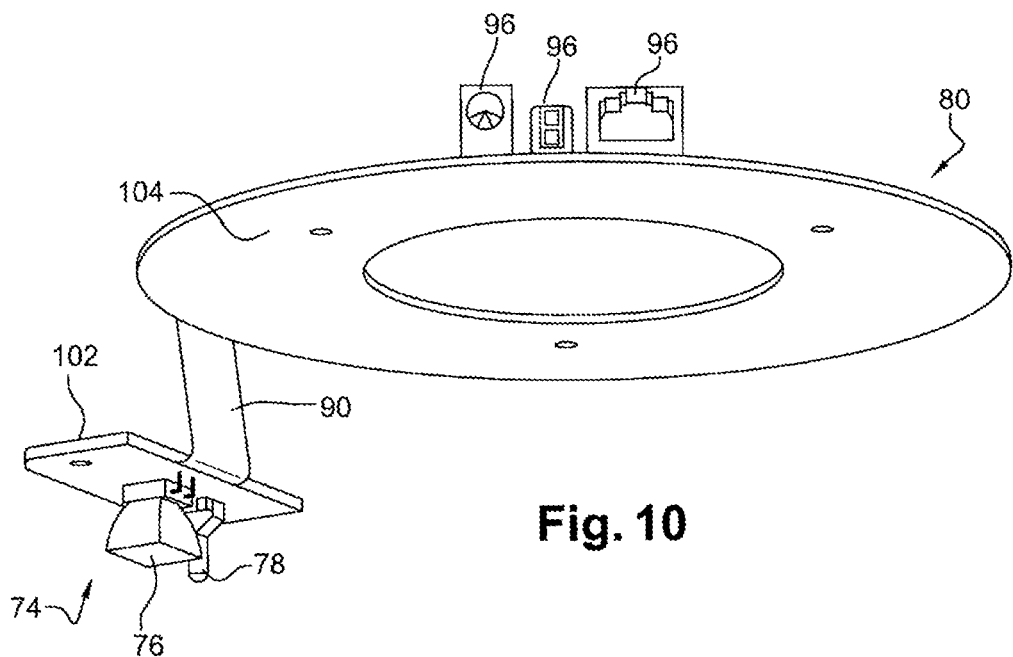
FIG. 10 shows a perspective view of a printed circuit board for the signal processing module of the light fixture according to the invention.

This photoreception module 74 also comprises a printed circuit board 102, shown in detail in FIG. 10, and carrying the photoreceiver 76. In addition, optionally, the photoreception board 102 comprises an illuminated operation indicator 78 comprising for example a light-emitting diode. The printed circuit board 102 is referred to as photoreception board 102.

This photoreceiver 76 is configured to receive a light beam from the remote terminal 16 which transmits a so-called uplink data signal and the lighting module 50 is configured to emit a light beam which transmits a so-called downlink data signal. For this purpose, the lighting module 50 also comprises a unit 53 for controlling the lighting source 52.

In self-evident fashion, to carry the data signals, the beams of light emitted or received are modulated in intensity at very high frequency.

Lastly, the light fixture 12 further comprises a module 80 for processing of data signals, in this example, called uplink or downlink data signals, according to at least one network communication protocol 12. This processing module 80 comprises at least one unit 82 for receiving or at least one unit 84 for transmitting data signals according to LiFi (or Light Fidelity) technology.

Figure 11:
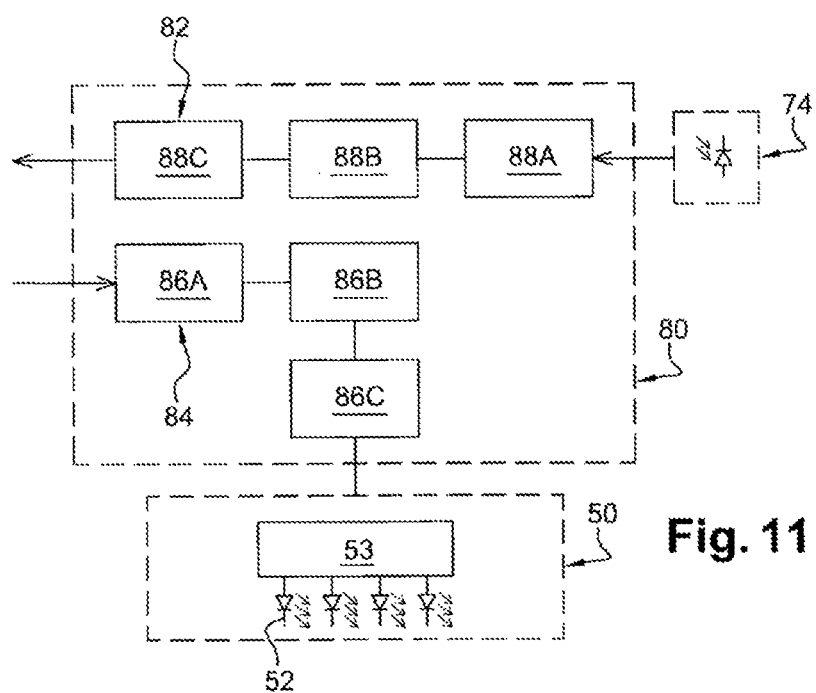
FIG. 11 shows a functional diagram of the various elements of the light fixture.

FIG. 11 shows, schematically, an example of functional organization of the various lighting, processing and photoreception modules.

This FIG. 11 shows that the processing module 80 is connected at the same time to the network 14, to the lighting module 52 and to the photoreception module 74. In this example, the processing module 80 thus comprises various units forming data transmission chains.

Thus, the processing module 80 comprises for example a first downlink flux data processing channel which forms a LiFi emission unit 84. The first channel 84 comprises a unit for receiving 86A a data signal according to the communication protocol of the network coming from the network 14 and a unit 86B for processing the data signal according to a LiFi protocol then a unit 86C for transmission towards the lighting module 50 to transmit a data signal by the light flux.

The processing module 80 also comprises a second uplink flux data processing channel 82 which forms a LiFi receiving unit. The second channel 82 comprises a unit 88A for receiving the data signal coming from the photo-reception module, a unit 88B for processing the signal to format it according to a network communication protocol, and then a unit 88C for transmission towards the Internet communication network 14.

The processing module 80 also comprises a printed circuit board 104, referred to as processing board 104.

Due to the invention, all processing 80, lighting 50 and photo-reception 76 modules are placed in an enclosure delimited by the housing 24 of the light fixture 12.

According to the invention, the processing board 104 extends transversely inside the housing 24 and at a distance from the base 28. In addition, the photoreceiver 76 is connected electrically to the processing board 104 by an electronic interconnection element 90 extending roughly axially. Moreover, the lighting module 50 is connected electrically to the processing board 104 by means of a flat cable. For this purpose, the lighting module 50 comprises the connection terminal 68. There is a virtually identical terminal for example on the processing board 104.

In the example described, the processing board 104 carrying the processing module 80 extends between the lighting module 50 and the base 28. However, in a variant not shown, the lighting module 50, and more precisely the processing board 104 carrying the lighting module 50, can extend in the same transverse plane as the processing board 104 carrying the processing module 80.

Preferably, the processing board 104 occupies roughly the entire area of a cross section of the light fixture 12. In the example described, the cross section of the light fixture 12 has a general disc shape. In this case, the processing board 104 has a general disc shape. In the example described, the board 104 has a central opening for the passage of light and therefore has the general shape of a closed crown. Of course, depending on the general shape of the light fixture, the cross section of the light fixture can have various shapes (square, rectangular, oval, etc.).

In the illustrated example, the processing board 104 extends between the lighting module 50 and the base 28. In order to let the light emitted by the lighting module 50 pass towards the window 30, the contour of the processing board 104 delimits an opening for passage of light. Preferably, for this purpose, the processing board 104 has a general shape of an open or closed crown.

Taken axially, the distance between the base 28 and the processing board 104 is greater than ten millimeters, preferably greater than thirty millimeters. This makes it possible to position the connectors 96 positioned above the thickness of the covering panel of a drop-ceiling when the light fixture 12 is mounted in the embedment structure.

For example, as illustrated by FIG. 10, the electronic interconnection element 90 is formed by a "semiflex" type flexible printed circuit wafer.

In self-evident fashion, a "semiflex" is formed from a rigid printed circuit wafer for example of type FR4 (made up of epoxy resin reinforced by fiberglass) from which a thickness of material has been removed in order to give it flexible properties. This kind of semiflex circuit allows a 90° flexion of a rigid printed circuit wafer. Once in position, the semiflex circuit portion is immobile. Thus, in the example described, the processing board 104 and the photoreception board 102 come from the same initial printed circuit wafer and are interconnected by a semiflex portion formed by reducing the material of the initial wafer in this portion (FIG. 10) in order to separate two rigid portions 102 and 104.

However, the electronic interconnection structural element 90 can, as a variant, be formed by a flat cable or a flex printed circuit. The disadvantage of these two other connection techniques is that they both require connection terminals, which produce electronic noise that can harm the proper performance of the electronic circuits that make up the processing and photoreception modules.

In the example described, the internal wall of the housing 24 has studs protruding axially 92 to receive screws for anchoring the processing board 104 to the housing 24. These studs 92 are obtained preferably when the shell 70 (FIG. 7) is molded.

In this embodiment, the lighting module 50 comprises an optical element 58 for shaping the light beam emitted by the lighting source and coupled to the lighting source. The processing board 104 extends preferably around this optical element 58.

As illustrated in FIG. 10, the processing board 104 comprises at least one connector element 96 for the physical connection to the telecommunication network. For example, the connector element 96 comprises an RJ45 socket. In the illustrated example, the processing board 104 carries three connector elements 96: an RJ45 socket, an element connecting to an electric power supply network that has a female receptacle, a socket for connecting to a lighting management network, for example of the Dali type.

In the example described, the element 96 for connecting to the telecommunication network and/or to the electric power supply network can comprise a male receiver or a female receiver arranged to be able to cooperate with a male or female end of at least one electric cable (and/or) a corresponding network cable in order to establish an electric connection (and/or network) between the cable and the light fixture 12. Moreover, in an alternative or complementary way, the connector element 96 can comprise at least one male or female optical receiver arranged to be able to cooperate with a male or female end of a corresponding optical fiber in order to establish an optical coupling between the said corresponding optical fiber and the light fixture in order to be able to transfer digital data.

The connector elements 96 are preferably located on the periphery of the housing and oriented radially and towards the outside of the housing in order to facilitate the connection of the electric cable(s), communication network or optical fiber. Indeed, this advantageous configuration makes it possible, when the light fixture is partially inserted into the embedment opening for example of the drop-ceiling, to facilitate the handling of the electric cables that are in the ceiling or the drop-ceiling, as well as their connection to the light fixture through the said connection element, which is then favorably oriented in the direction of the electric cables.

In the illustrated example, the housing 24 comprises an opening 94 for access to the connector 96 through its peripheral wall 26. This access opening 94 is made in the shell 70.

Preferably, the connector elements 96 are for example welded directly onto the processing board 104 by a plurality of small pins which hold them in place.

However, because of the significant traction efforts at the time of multiple connections and disconnections, the grip of the connectors on the processing board is fragile. Indeed, for example, when pulling on the cord of the RJ45 cable, one of the pins holding the connector RJ45 onto the processing board 104 can come off by breaking the weld.

In order to avoid premature degradation of the connectors 96, the light fixture 12 also preferably comprises a casing plate 98 which is adapted to mask the access openings 94 while delimiting a bezel 99 that fits the peripheral contour of each connector 96.

This casing plate 98 also has a function of immobilizing the connector(s) 96 with respect to the light fixture 12 so that repeated efforts will not pull the connector 96 loose from the processing board 104. For example, the connector 96 has, on its circumference, elastically deformable strips that are configured to press against the casing plate 98 by elastic return of the strips when the connector 96 is inserted into the plate 98. Each bezel 99 delimits for example the contour of the corresponding connector 96.

In the example described, the plate 98 is affixed to the shell 70 by headforming of at least one plastic slug 97 integrally formed with the shell 70. For this purpose, the plate 98 comprises a fixation rim comprising a hole for passage of the headforming slug 97. According to the headforming technique, the plate 98 is mounted on the shell 70 by plastic deformation of the slug 97 in an operation of heating the slug in order to create a mechanical connection between the two elements.

The main aspects of manufacturing a light fixture according to the invention illustrated in FIGS. 1 to 11 will now be described.

Pursuant to FIG. 5, the assembly of the light fixture is relatively easy. The various stages of assembly generally consist of stages of screwing the various elements that make up the light fixture 12.

Initially, the casing plate 98 is positioned so that the headforming slug 97 is inserted into the hole provided for that purpose on the plate 98. By adding heat, this slug 97 is deformed plastically to immobilize the plate 98 with respect to the shell 70.

Then, during a second phase, the processing board 104 is screwed to the shell 70 thanks to the fixation studs 92. The connectors 96 are positioned at the access opening 94 of the shell 70 and are inserted elastically inside the casing plate 98. In this way, the light fixture can be functionally personalized. In fact, to supply a light fixture that has other connectors 96 or a smaller number of connectors 96, it is sufficient to modify the casing plate 98 and the board 104 carrying the connectors 96 with no need for modifying the shell 70.

During a third stage, the optical element 58 is inserted inside the shell 70. During a fourth stage, the heat sink 64 and the lighting modulate 50 are affixed onto the shell 70.

In addition, the spring-holding means 34 are assembled by screwing onto a peripheral rim of the shell 70 and the base 28.

Once assembled, the light fixture 12 forms a compact, sturdy object that provides excellent protection of its integrated LiFi functional elements.

The light fixture according to the invention has the advantage of being particularly aesthetic while securely incorporating the functional modules of LiFi technology.

Of course, other embodiments are possible without departing from the framework of the invention. Thus, one skilled in the art can make various changes to the invention that has just been described as an example.

The invention claimed is:

1. A light fixture connected to at least one telecommunication network for communicating data by light with a remote terminal, of the type comprising:
   a housing delimiting a peripheral wall around a reference axis and having a base that delimits a light emission window,
   a photoreceiver arranged in the housing and configured to receive a light beam from the remote terminal carrying an uplink data signal,
   a lighting module arranged in the housing and configured to emit a light beam through the window, carrying a downlink data signal,
   a module for processing data signals according to at least one communication protocol of the network,
   wherein:
   the light fixture comprises a printed circuit board, called a processing board, extending transversely inside the housing and at a distance from the base, on which the processing module is mounted, and
   the processing board comprises an opening for transmission of the light emitted by the lighting module through the light fixture.

2. The light fixture according to claim 1, wherein the processing board roughly occupies all the area of a cross section of the light fixture.

3. The light fixture according to claim 1, wherein the photoreceiver is connected electrically to the processing board by an electronic interconnection element extending roughly axially inside the housing.

4. The light fixture according to claim 3, wherein the photoreceiver is carried by a printed circuit board, called a photoreception board, and the electronic interconnection element is formed by a semiflex printed circuit flexible wafer connecting the photoreception board and the processing board.

5. The light fixture according to claim 1, wherein, taken axially, the distance between the base and the processing board is greater than ten millimeters.

6. The light fixture according to claim 1, wherein the processing board has a general shape of an open or closed crown.

7. The light fixture according to claim 1, wherein the housing includes an internal wall having studs protruding axially to receive screws for anchoring the processing board to the housing.

8. The light fixture according to claim 1, wherein, the lighting module comprises a lighting source and an optical element for shaping the light beam emitted by the lighting source and coupled to the lighting source, and the processing board extends around the optical element.

9. The light fixture according to claim 8, wherein the optical element has a proximal end coupled to the lighting source and a distal end emerging onto the light emission window.

10. The light fixture according to claim 8, wherein the optical element is chosen from among a reflector comprising a reflective internal surface and a lens.

11. The light fixture according to claim 1, wherein the housing comprises a cover assembled on the base to house the processing board and the lighting module.

12. The light fixture according to claim 1, wherein the base is made of a material essentially comprising a plastic or metal material.

13. The light fixture according to claim 1, wherein the processing board comprises at least one element connecting to the telecommunication network and the housing comprises an opening for access to the connector through its peripheral wall.

14. The light fixture according to claim 13, comprising a casing plate which is configured to mask the access opening while delimiting a bezel that fits a peripheral contour of the connector.

15. The light fixture according to claim 1, wherein the base has means of securing the light fixture to an opening of a structure adapted for pressure-holding the light fixture through the structure, the structure having a visible face and an opposite hidden face.

16. The light fixture according to claim 1, comprising a part for thermal dissipation of the heat generated during operation of the lighting module, carried by the housing.

17. The light fixture according to claim 1, wherein the processing module comprises at least one unit for receiving or at least one unit for emitting data signals according to LiFi technology.

18. The light fixture according to claim 1, that is able to communicate data with a remote terminal at a theoretical throughput greater than ten megabits per second, preferably greater than forty megabits per second.

19. A processing board of the light fixture according to claim 1, on which the processing module is mounted, wherein the board has a general shape of an open or closed crown in order to delimit an opening for transmission of light when the board is arranged in the light fixture.

20. A light fixture connected to at least one telecommunication network for communicating data by light with a remote terminal, of the type comprising:
- a housing delimiting a peripheral wall around a reference axis and having a base that delimits a light emission window,
- a photoreceiver arranged in the housing and configured to receive a light beam from the remote terminal carrying an uplink data signal,
- a lighting module arranged in the housing and configured to emit a light beam through the window, carrying a downlink data signal,
- a module for processing data signals according to at least one communication protocol of the network, wherein:
- the light fixture comprises a printed circuit board, called a processing board, extending transversely inside the housing and at a distance from the base, on which the processing module is mounted,
- the lighting module comprises a lighting source and an optical element for shaping the light beam emitted by the lighting source and coupled to the lighting source, and
- the processing board extends around the optical element.

* * * * *